United States Patent Office 3,247,436
Patented Apr. 19, 1966

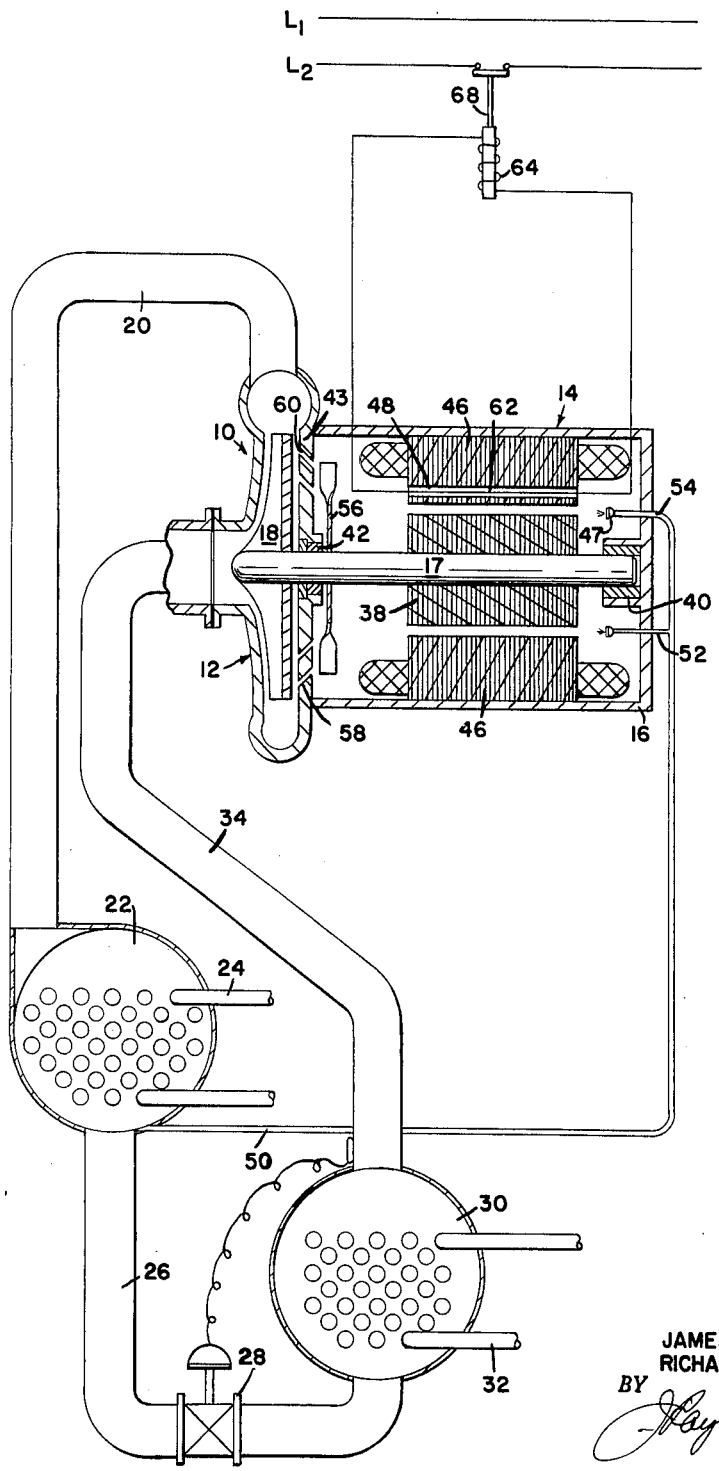
INVENTORS.
JAMES W. ENDRESS.
RICHARD R. SHOLLENBERGER.
BY
ATTORNEY.

3,247,436
MOTOR PROTECTION APPARATUS AND
METHOD OF OPERATION
James W. Endress and Richard R. Shollenberger, Syracuse, N.Y., assignors to Carrier Corporation, Syracuse, N.Y., a corporation of Delaware
Filed Apr. 19, 1962, Ser. No. 188,784
6 Claims. (Cl. 318—434)

This invention relates broadly to motor protection devices. More particularly, this invention relates to motor protection devices particularly suited for use with motors having passages formed in the heat generating components for the flow of a cooling medium therethrough.

It is well known that electric motors often incur damage under circumstances where a heavy current flow is sustained due to either a temporary or permanent overload of the motor. The supply of high current to the motor involves heating the insulated conductors forming the windings of the motor to a temperature above that considered normal for the particular motor. If the degree of heat involved is great enough the insulation on the conductors in the motor windings is destroyed and a breakdown in operation accompanied by serious damage such as fire often occurs.

Various devices have been proposed for the purpose of detecting abnormally high temperatures in the motor windings. A popular form of motor protection device is a thermal unit which acts in the presence of an unduly high temperature to open the switch supplying electric energy to the motor windings.

In equipment of the kind under consideration it has been proposed that motor windings be cooled by passage of a cooling medium thereover. However, under these circumstances the current draw may exceed a value normally associated with a high temperature condition and no damage will occur as long as the cooling system is operable. This invention has for its principal object, the provision of an improved motor protection device which is related solely to the value of the current supplied to the motor windings and is independent of the temperature of the windings. With such an arrangement, a failure of the cooling system will not result in damage to the motor as would be occasioned where the protection device is based solely upon thermal considerations.

Another object of the invention is the provision of an improved motor protection device particularly suited for use with a motor having at least one of the components having a passage provided therein for the flow of a cooling medium.

Another object of the invention is the provision of an improved method of protecting a motor from damage due to heavy current draw caused by excessive loading of the motor.

Still another object of the invention is the provision of an improved method of protecting an electric motor from damage occasioned by excessive current draw which includes detecting excessive current draw of a magnitude sufficient to create a heating effect injurious to the motor components and utilizing the excessive current draw to actuate a control regulating the supply of electric energy to the motor.

A still further object of the invention is the provision of an improved method of the kind described wherein variations in the magnetic field of the motor windings created by change in current supplied to the motor windings is utilized to actuate a control regulating the supply of electric energy to the motor unit.

This invention relates to an improved motor protection device comprising an electric circuit including an element responsive to variations in the magnetic field created by the windings in the motor and which, in response to excessive current draw by the windings, provides, through a transformer action, flow of electric energy therein sufficient to actuate a control member in series therewith, said element being positioned within one of the passages provided for the flow of cooling medium through the motor.

These and other objects of the invention will be apparent upon a consideration of the ensuing specification and drawings in which:

The figure is a schematic representation of an illustration of the motor protection device forming the subject of the invention.

Referring more particularly to the drawing wherein one embodiment of the invention is illustrated for the purpose of describing the invention, a motor compressor unit 10 of the kind employed in a centrifugal refrigeration machine includes a compressor section 12 and a motor section 14. A housing 16 encloses the motor, the rotor of which, is mounted on a shaft 17 serving also to mount the impeller 18. The centrifugal compressor forwards compressed gaseous refrigerant through line 20 to a condenser 22 where the refrigerant is converted to the liquid phase through the action of a cooling medium flowing in coil 24. From the condenser the liquid refrigerant flows through line 26 to evaporator 30. A restriction 28 of a conventional type is interposed between the condenser and evaporator in line 26. Liquid refrigerant is converted to the gaseous state in the evaporator 30 and flows through suction line 34 to the inlet of the compressor. The liquid refrigerant is converted to the gaseous state in the evaporator as heat is extracted from a medium flowing in coil 32 forming part of a chilled water circuit of the kind widely used in air conditioning equipment.

Referring more particularly to the motor compressor unit, shaft 17 is supported in bearing elements 40 and 42 mounted in the housing 16 and wall 43 separating the motor compartment from the compressor compartment. A rotor 38 of the conventional type is secured to the shaft 17. Stator 46 is shown encircling rotor member 38 and is provided with at least one and preferably a number of passages 48 extending longitudinally through the laminated material forming the stator structure. Passages 48 are provided for the purpose of assuring flow of cooling medium throughout the stator structure in a manner to be later described.

Line 50 is shown connecting the condenser 22 with branches 52 and 54 terminating within the motor compartment in spray members 47. The latter members are aligned with the space formed by the clearance between the rotor and stator members. Line 50 provides a supply of liquid refrigerant from the condenser to the motor compartment for the purpose of cooling the rotor and stator members. Fan 56 is secured to the shaft 17 and is provided for the purpose of inducing flow of cooling medium through the clearance space described above as well as directing the vapor created, through the passages 48 to outlets 58 and 60 connected to discharge line 20.

In order to detect a condition characteristic of motor overload, there is provided a circuit including conductor 62 arranged in one or more of the passages 48. Conductor 62 forms a circuit with a coil 64 of a relay 68 or other control and is adapted to be energized in response to the creation of current flow in conductor 62 of a predetermined magnitude. It will be appreciated that the conductor 62 is arranged in passage 48 so as to sense the strength of the magnetic field created in the stator as a result of the current supplied to the windings in the stator member. Conductor 62 is situated so that an induced voltage or potential is created, the value of which, depends upon the intensity of the magnetic field produced by the current draw of the motor. The action is similar to that involved in a conventional transformer. When the current draw of the motor windings reaches an undesirably high level, a predetermined value of induced current flows in the electric circuit including conductor 62. The magnitude of this current flow is sufficient to energize relay 68 either directly or by amplification and open the circuit between the power source and the motor. It will thus be appreciated that there is provided an arrangement for detecting the presence of a current in the motor windings of a magnitude sufficient to endanger the windings in the event the heat accompanying the current flow is not properly dissipated. The arrangement described is free of thermal considerations except as they contribute to the value of induced current flow and provides a novel electromagnetic arrangement for detecting motor overload. Other constructions capable of illustrating the invention will be apparent to those skilled in the art. For example, it might be desirable to pass conductor 62 through one of the looped end portions of the windings normally projecting beyond the terminal limits of the stator. Thus the transformer action may be obtained without the necessity of providing passages through the stator under circumstances where cooling of the motor is accomplished by means other than those described above.

While we have described a preferred embodiment of the invention it will be understood that the invention is not limited thereto, since it may be otherwise embodied within the scope of the following claims.

We claim:

1. In a refrigeration machine including a compressor, an electric motor for driving the compressor, said motor being provided with at least one passage for flow of cooling medium therethrough, and means for supplying refrigerant from the machine to cool said motor, a motor protection device comprising electro-responsive means positioned in said passage and regulating operation of said motor, said last-mentioned means being operable in response to variations in the magnetic field of the motor windings.

2. In a refrigeration machine including a compressor, an electric motor for driving the compressor, said motor being provided with at least one passage for flow of cooling medium therethrough and means for passing a cooling medium through said passage, a motor protection device comprising electro-responsive means positioned in said passage and regulating operation of said motor, said last-mentioned means being operable in response to variations in the magnetic field of the motor windings.

3. In a refrigeration machine including a compressor, an electric motor for driving the compressor, said motor being provided with at least one passage for flow of cooling medium therethrough and means for passing a cooling medium through said passage, a motor protection device comprising an electric circuit including an electric conductor positioned in said cooling passage so as to be responsive to fluxations in the magnetic field of the windings of said motor and a control element in series with said conductor and adapted to be energized by the creation of current flow in said conductor of a magnitude indicative of magnetic field of a predetermined intensity.

4. In combination, an electric motor including a rotor and a stator construction wherein said stator is provided with a passage for the flow of cooling medium therethrough, electric conductors associated with said stator construction, a source of electric energy for energizing said conductors, a motor protection device comprising an electric circuit having a portion thereof disposed within said passage so as to have a variable current flow induced therein by the action of the magnetic field created in response to the flow of electric energy in said stator and means operable in response to a predetermined flow of current in said circuit for regulating supply of energy to the conductors serving the stator.

5. The method of protecting a motor from damage due to excessive electric current flow which comprises the steps of providing a plurality of axial passages extending through the stator for the purpose of providing a path for the flow of cooling medium, inserting an electrical conductor through one or more of said passages so as to be influenced by the intensity of the magnetic flux created by the current flowing within the conductors positioned in said stator and utilizing the electrical energy induced in said conductor to actuate a switch regulating operation of the motor.

6. The method of protecting an electric motor having at least one passage extending therethrough for the passage of cooling medium from damage due to excessive current supply to the windings thereof which comprises the steps of forming an electric circuit including a conductor portion subject to variations in the magnetic field produced by changes in the magnitude of the current supplied to the motor windings, positioning the conductor portion within said passage so as to have flow of electric energy induced therein by the action of said magnetic field and utilizing electric energy flow of a predetermined magnitude within said conductor to interrupt flow of current to the motor windings.

References Cited by the Examiner

UNITED STATES PATENTS

| Re. 24,802 | 3/1960 | Kocher et al. | 62—475 |
|---|---|---|---|
| 2,165,082 | 7/1939 | Weber | 318—221 |
| 2,629,076 | 2/1953 | Lloyd et al. | |
| 2,668,268 | 2/1954 | Hunter et al. | 318—474 |
| 2,716,196 | 8/1955 | Anderson et al. | 310—68 |
| 2,728,883 | 12/1955 | Hubacker | 318—221 |
| 2,731,587 | 1/1956 | Brightman | 318—221 |
| 2,986,905 | 6/1961 | Kocher et al. | 62—475 |
| 3,043,968 | 7/1962 | Ward | 310—54 |
| 3,088,042 | 4/1963 | Robinson | 310—54 |

ORIS L. RADER, *Primary Examiner.*

R. COOKE, J. C. BERENZWEIG, *Assistant Examiners.*